(12) United States Patent
Choudhury et al.

(10) Patent No.: US 8,824,488 B2
(45) Date of Patent: Sep. 2, 2014

(54) METHODS, APPARATUS AND ARTICLES OF MANUFACTURE TO SELECT LABEL SWITCHED PATHS (LSPS) FOR PREEMPTION

(75) Inventors: Gagan Choudhury, Marlboro, NJ (US); Thomas Bradley Scholl, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 775 days.

(21) Appl. No.: 12/965,314

(22) Filed: Dec. 10, 2010

(65) Prior Publication Data

US 2012/0147895 A1 Jun. 14, 2012

(51) Int. Cl.
*H04L 12/28* (2006.01)

(52) U.S. Cl.
USPC .......................................... 370/401

(58) Field of Classification Search
CPC ....... H04L 45/50; H04L 45/22; H04L 47/245; H04L 45/28; H04L 45/00; H04L 12/5695; H04L 41/0896; H04L 45/04; H04L 45/12; H04L 45/302; H04L 47/822; H04L 45/123
See application file for complete search history.

(56) References Cited

U.S. PATENT DOCUMENTS

| | | | |
|---|---|---|---|
| 5,881,050 A | 3/1999 | Chevalier et al. | |
| 6,363,319 B1 | 3/2002 | Hsu | |
| 6,721,269 B2 | 4/2004 | Cao et al. | |
| 6,956,821 B2 * | 10/2005 | Szviatovszki et al. | 370/237 |
| 7,359,386 B2 | 4/2008 | Vasseur et al. | |
| 7,372,870 B2 * | 5/2008 | Huang et al. | 370/466 |
| 7,417,950 B2 | 8/2008 | Hofmeister et al. | |
| 7,489,687 B2 * | 2/2009 | Chavez et al. | 370/392 |
| 7,660,254 B2 | 2/2010 | Vasseur et al. | |
| 7,688,732 B2 * | 3/2010 | Manzalini et al. | 370/235 |
| 2005/0117512 A1 | 6/2005 | Vasseur et al. | |
| 2006/0250961 A1 | 11/2006 | Vasseur | |

OTHER PUBLICATIONS

Vieira et al., "A Proposal and Evaluation of a LSP Preemption Policy Implemented with Fuzzy Logic and Genetic Algorithms in a DiffServ/MPLS Test-bed," Proceedings of International Conference on Communications, Circuits and Systems, May 27-30, 2005, vol. 1, pp. 109-114. (6 pages).
Oliveira et al, "Label Switched Path (LSP) Preemption Policies for MPLS Traffic Engineering," RFC: 4829, Apr. 2007. (20 pages).
Juttner et al., "On-demand optimization of label switched paths in MPLS networks," Proceedings of 9th International Conference on Computer Communications and Networks, Oct. 16-18, 2000, Las Vegas, NV, p. 107-113. (7 pages).
Semeria et al., "Traffic Engineering for the New Public Network," Dedicated Systems Magazine, 2000 Q4. (4 pages).

* cited by examiner

*Primary Examiner* — Chi Pham
*Assistant Examiner* — Raul Rivas
(74) *Attorney, Agent, or Firm* — Hanley, Flight & Zimmerman, LLC (57) ABSTRACT

Example methods, apparatus and articles of manufacture to select label switched paths (LSPs) for preemption are disclosed. A disclosed example method includes sorting a first list of first label switched paths based on their respective bandwidths and priorities to form a sorted first list, each of the label switched paths having a lower priority than a requested label switched path, sequentially marking the first label switched paths for preemption based on their position in the sorted list until a bandwidth associated with the marked label switched paths exceeds a bandwidth gap, and configuring a routing engine to preempt the marked first label switched paths.

19 Claims, 12 Drawing Sheets

| Algorithm | Average Bandwidth Overshoot Per Preemption Event (Mbps) | Average value of N, the Number of Preemptions Per Preemption Event |
|---|---|---|
| Algorithm 0 | 3021 | 17.1 |
| Algorithm 1 with b0 = 0 | 531 | 22.1 |
| Algorithm 1 with b0 = 100 kbps | 580 | 8.3 |
| Algorithm 2 | 563 | 6.4 |
| Algorithm 3 | 893 | 1.1 |

METHODS, APPARATUS AND ARTICLES OF MANUFACTURE TO SELECT LABEL SWITCHED PATHS (LSPS) FOR PREEMPTION

FIELD OF THE DISCLOSURE

This disclosure relates generally to label switched paths (LSPs) and, more particularly, to methods, apparatus and articles of manufacture to select LSPs for preemption.

BACKGROUND

In communication networks such as Internet protocol (IP) networks implemented using LSPs it may be necessary to preempt one or more lower priority LSPs during the routing of a higher priority LSP due to insufficient available bandwidth. When an LSP is preempted it may be taken down immediately causing loss of data packets until it is re-routed over a different path (i.e., a so-called hard preemption), or the preempted LSP may be allowed to remain active until it is rerouted over a different path and only then the original path of the preempted LSP is taken down thereby avoiding any loss of data packets (i.e., a so-called soft preemption).

DETAILED DESCRIPTION

Example methods, apparatus and articles of manufacture to select label switched paths (LSPs) for preemption are disclosed. A disclosed example method includes sorting a first list of first label switched paths based on their respective bandwidths and priorities to form a sorted first list, each of the label switched paths having a lower priority than a requested label switched path, sequentially marking the first label switched paths for preemption based on their position in the sorted list until a bandwidth associated with the marked label switched paths exceeds a bandwidth gap, and configuring a routing engine to preempt the marked first label switched paths.

A disclosed example router includes a routing database to store routing information for first label switched paths, a preemption selector to sort a first list of the first label switched paths based on their respective bandwidths and priorities to form a sorted first list, each of the label switched paths having a lower priority than a new label switched path, and sequentially mark the first label switched paths for preemption based on their position in the sorted list until a bandwidth associated with the marked label switched paths exceeds a bandwidth gap, and a routing and forwarding engine to update the routing database to preempt the marked first label switched paths.

When the setup of an LSP requires the preemption of lower priority LSPs, the examples disclosed herein select, determine or identify the set of LSPs to preempt that reduces or minimizes bandwidth overshoot, and which reduces or minimizes the number of preempted LSPs. Bandwidth overshoot represents an excess amount of preempted bandwidth. Letting G represent the amount of bandwidth that needs to be released to accommodate the preempting LSP, and letting H represent the cumulative or sum total of the LSPs being preempted, bandwidth overshoot can be expressed mathematically as H-G. When more bandwidth is preempted than necessary, the overall efficiency or performance of the communication system may be reduced. Additionally, as more LSPs are preempted, additional control plane and signaling plane work is required to handle or process the preemption of those LSPs. If a large enough number of LSPs is preempted, a control plane "storm" might be caused. Accordingly, methods, apparatus and articles of manufacture that select a set of LSPs to preempt while reducing bandwidth overshoot and reducing the number of preempted LSPs provide numerous beneficial effects on network performance, network efficiency and network reliability.

In the interest of brevity and clarity, throughout the following disclosure references will be made to an example Internet protocol (IP) multiprotocol label switching-traffic engineering (MPLS-TE) communication network 110. However, the example methods, apparatus and articles of manufacture may be used to select paths, tunnels, connections, etc. for preemption for any number and/or type(s) of other networks implemented using any number and/or type(s) of additional or alternative network protocols such as, but not limited to, generalized MPLS networks. Further, while in some examples priorities are used to distinguish different quality of service (QoS) classes, priorities may be used or assigned for any number and/or type(s) of additional or alternative purposes.

Within particular examples described herein, a router may be referred to as a headend router and/or a tailend router. However, the identification of a router as a headend router or a tailend router only relates to the uni-directional transport of data, packets and/or packet streams between the headend router and the tailend router via a particular communication link. In many instances, the routers will have reversed roles for the uni-directional transport of data, packets and/or packet streams between the routers in the reverse direction. Moreover, a router may participate in multiple transmissions (sequentially and/or in parallel) in which its role as headend and tailend may differ and/or vary. The adjectives headend and tailend serve only to clarify a router's functionality during descriptions of an example communication network 100. As used herein, a communication link may consist of a single communication path, or may be a composite link implemented by a plurality of communication paths.

Figure 1:
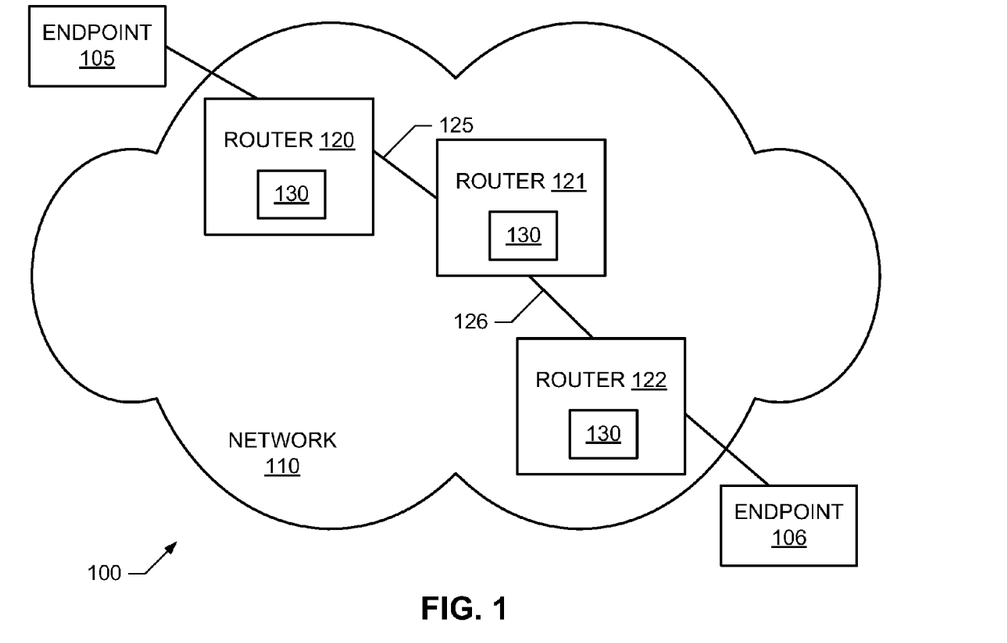
FIG. 1 is a schematic illustration of an example communication system implemented in accordance with the teachings of this disclosure.

FIG. 1 illustrates the example communication system 100. To facilitate, implement and/or provide communication services between a plurality of endpoints, two of which are designated at reference numerals 105 and 106, the example communication system 100 of FIG. 1 includes the example IP MPLS-TE communication network 110. To route and/or transport data, packets and/or packet streams between and/or among the example endpoints 105 and 106, the example network 110 of FIG. 1 includes a plurality of routers, three of which are designated at reference numerals 120, 121 and 122. Data or traffic such as packets exchanged between the endpoints 105 and 106 is routed through the network 110 by the example router(s) 120-122. The example routers 120-122 of FIG. 1 are communicatively coupled to each other via any number and/or type(s) of uni-directional and/or bi-directional communication links. For example, the router 121 is communicatively coupled to the router 120 via a communication link 125 and to the router 122 via a communication link 126.

Consider an example LSP L being setup between the router 120 and the router 122 to transport data from the endpoint 105 to the endpoint 106. Using for example, constrained shortest path first routing, the example router 120 finds a route through the network 110 for the LSP L. The identified route comprises one or more communication links of the network 110, with the tailend router of each communication link being the headend router of a subsequent link. For the example LSP L, the router 120 is the headend for the communication link 125, the router 121 is the tailend for the communication link 125 and the headend for the communication link 126, and the router 122 is the tailend for the communication link 126. The identified route needs to have sufficient bandwidth to carry the new LSP L and any existing LSPs that are not preemptible by the LSP L. As the LSP L is being setup, the LSP L is assigned a setup priority p, where p=1, 2, . . . P, a smaller number indicates higher priority and P is the lowest assignable priority. Once setup, the LSP L may be assigned the same or a different holding priority. While setting up the LSL L of priority p, the LSP L may, as necessary, preempt an existing LSP of priority k>p, where k represents the holding priority of the preempted LSP.

Once the route is identified, chosen or selected by the example router 120 of FIG. 1, the router 120 sends one or more messages to reserve bandwidth along the identified path for the LSP L. The headend router of each communication link (e.g., the router 121 for the communication link 126) reserves bandwidth on that communication link for the LSP L. In reserving the bandwidth, the headend router 120-122 of each communication link 125, 126 may need to preempt one or more existing LSPs. The LSPs selected to be preempted at a first router (e.g., the router 120) to accommodate the LSP L may be different from the LSPs selected for preemption at a second router (e.g., the router 121) to accommodate the same LSP L. In other words, each of the example headend routers 120-122 of FIG. 1 make independent decisions regarding which LSPs to preempt on their respective communication links 125, 126.

To select LSPs for preemption, each of the example routers 120-122 of FIG. 1 includes an LSP preemption selector 130. While in the illustrated example of FIG. 1 each of the example routers 120-122 includes the example LSP preemption selector 130, in other examples, not all of the routers 120-122 implement the LSP preemption selector 130. For example, different routers of the same or different network(s) may implement different methods, processes, algorithms and/or logic to select LSPs for preemption. FIGS. 4A, 4B, 5, 6A, 6B, 7, 8 and 9 illustrate example processes and example operations that may, for example, be embodied as machine-accessible instructions and executed by, for example, one or more processors to implement any of the example LSP preemption selectors 130.

Figure 2:
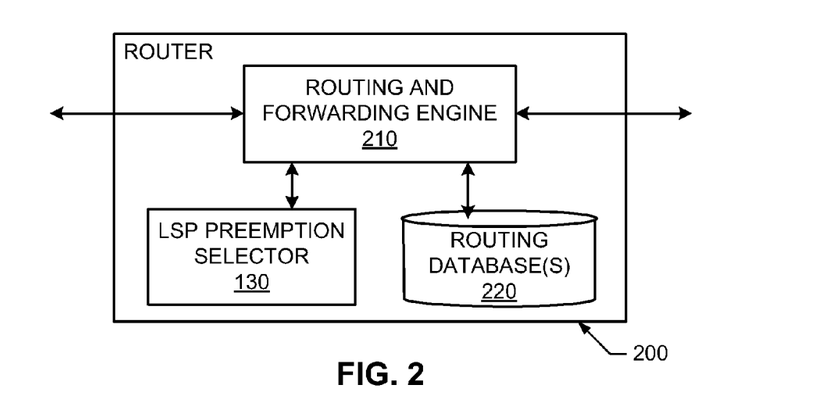
FIG. 2 illustrates an example manner of implementing any of the example routers of FIG. 1.

FIG. 2 illustrates an example manner of implementing any of the example routers 120-122 of FIG. 1. While any of the example routers 120-122 of FIG. 1 may be implemented as shown in FIG. 2, for ease of discussion the example router of FIG. 2 will be referred to as the router 200. To perform and/or make routing decisions, the example router 200 of FIG. 2 includes any number and/or type(s) of routing and forwarding engine(s) 210. In addition to making routing decisions, the example routing and forwarding engine 210 of FIG. 2 forwards and/or routes incoming packets between communication links (e.g., routes packets associated with the LSP L received on the communication link 125 onto the communication link 126).

To store routing tables, the example router 200 of FIG. 2 includes any number and/or type(s) of routing database(s) 220. Routing information, tables and/or data may be stored in the routing database 220 using any number and/or type(s) of data structures. The routing database 220 may be implemented by any number and/or type(s) of volatile and/or non-volatile memory(-ies), memory device(s) and/or storage device(s).

To select LSPs for preemption, the example router 200 of FIG. 2 includes the example LSP preemption selector 130. FIGS. 4A, 4B, 5, 6A, 6B, 7, 8 and 9 illustrate example processes and example operations that may, for example, be embodied as machine-accessible instructions and executed by, for example, one or more processors to implement the example LSP preemption selector 130 of FIG. 2.

Figure 3:
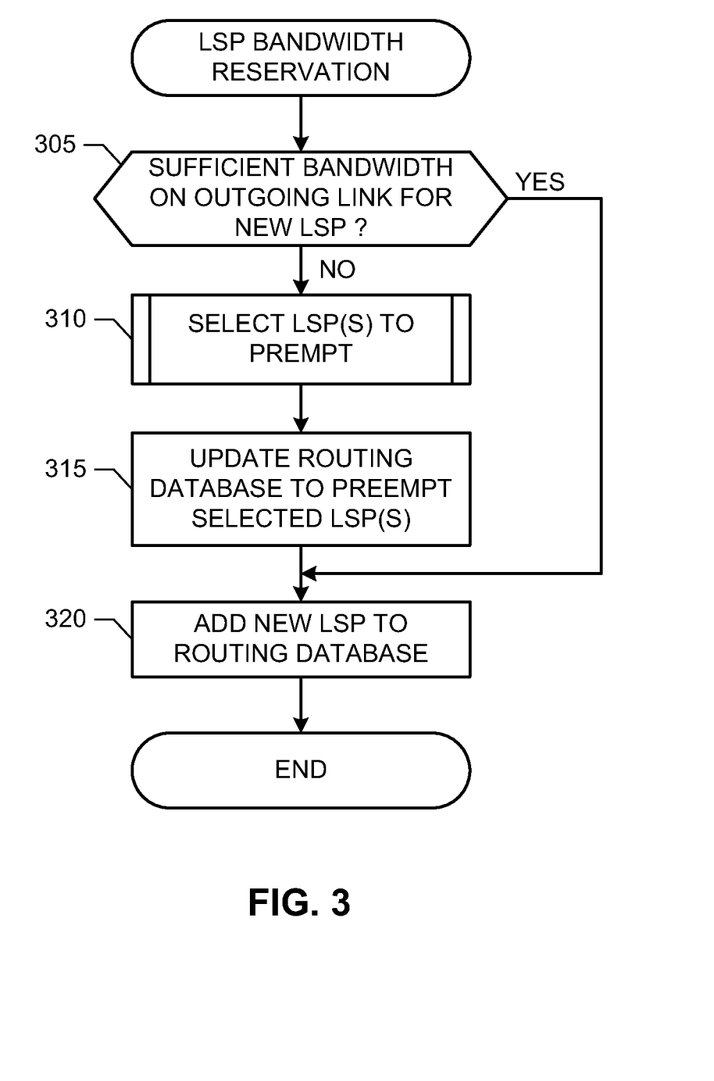
FIG. 3 is a flowchart representing an example process that may be embodied as machine-accessible instructions and executed by, for example, one or more processors to implement any of the example routers of FIGS. 1 and 2.

An example operation of the example router 200 of FIG. 2 is described with reference to the example flowchart of FIG. 3. FIG. 3 is a flowchart representing an example process that may be embodied as machine-accessible instructions and executed by, for example, one or more processors to implement the example router 200 of FIG. 2. A processor, a controller and/or any other suitable processing device may be used, configured and/or programmed to execute the example machine-readable instructions represented in FIG. 3. For example, the machine-readable instructions of FIG. 3 may be embodied in coded instructions stored on a tangible computer-readable medium. Machine-readable instructions comprise, for example, instructions that cause a processor, a computer and/or a machine having a processor to perform one or more particular processes. Alternatively, some or all of the example process of FIG. 3 may be implemented using any combination(s) of application specific integrated circuit(s) (ASIC(s)), programmable logic device(s) (PLD(s)) and/or field programmable logic device(s) (FPLD(s)), field-programmable gate array(s) (FPGA(s)), fuses, discrete logic, hardware, firmware, etc. Also, some or all of the example process of FIG. 3 may be implemented manually or as any combination of any of the foregoing techniques, for example, any combination of firmware, software, discrete logic and/or hardware. Further, many other methods of implementing the example operations of FIG. 3 may be employed. For example, the order of execution of the blocks may be changed, and/or one or more of the blocks described may be changed, eliminated, sub-divided, or combined. Additionally, the blocks of any or all of the example process of FIG. 3 may be carried out sequentially and/or carried out in parallel by, for example, separate processing threads, processors, devices, discrete logic, circuits, etc.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 11. As used herein, the term non-transitory computer-readable medium is expressly defined to include any type of computer-readable medium and to exclude propagating signals.

The example process of FIG. 3 begins when the example router 200 receives a setup request for an LSP L. The example routing and forwarding engine 210 of FIG. 2 determines whether there is currently sufficient available bandwidth on the outgoing communication link 125, 126 for the LSP L (block 305). If there is sufficient bandwidth (block 305), the example routing and forwarding engine 210 updates the example routing database 220 with the routing information for the LSP L (block 310). Control then exits from the example process of FIG. 3.

Returning to block 305, if there is not currently sufficient bandwidth on the outgoing link for the LSP L (block 305), the example LSP preemption selector 130 selects one or more lower priority LSPs for preemption (block 310). The example LSP preemption selector 130 carries out the example process of FIGS. 4A, 4B and 5, the example process of FIGS. 6A, 6B and 7, or the example process of FIGS. 8 and 9 to select the LSPs for preemption. The example routing and forwarding engine 210 updates the routing database 220 to reflect the preemption of the selected LSPs (block 315), and updates the example routing database 220 with the routing information for the LSP L (block 320). Control then exits from the example process of FIG. 3.

While the example communication network 110, the example routers 120-122, 200, the example LSP preemption selectors 130, the example routing and forwarding engine 210 and the example routing database 220 are illustrated in FIGS. 1 and 2, one or more of the elements, processes and/or devices illustrated in FIGS. 1 and 2 may be combined, divided, re-arranged, omitted, eliminated and/or implemented in any other way. Further, the example communication network 110, the example routers 120-122, 200, the example LSP preemption selectors 130, the example routing and forwarding engine 210 and/or the example routing database 220 may be implemented by hardware, software, firmware and/or any combination of hardware, software and/or firmware. Thus, for example, any of the example communication network 110, the example routers 120-122, 200, the example LSP preemption selectors 130, the example routing and forwarding engine 210 and/or the example routing database 220 could be implemented by the example processor platform P100 of FIG. 7 and/or one or more circuit(s), programmable processor(s), ASIC(s), PLD(s), FPLD(s), FPGA(s), fuses, etc. When any apparatus claim of this patent incorporating one or more of these elements is read to cover a purely software and/or firmware implementation, at least one of the example communication network 110, the example routers 120-122, 200, the example LSP preemption selectors 130, the example routing and forwarding engine 210 and/or the example routing database 220 are hereby expressly defined to include a tangible article of manufacture such as a tangible computer-readable medium storing the firmware and/or software. Further still, any of the example communication network 110, the example routers 120-122, 200, the example LSP preemption selectors 130, the example routing and forwarding engine 210 and/or the example routing database 220 may include one or more elements, processes and/or devices in addition to, or instead of, those illustrated in FIGS. 1 and 2, and/or may include more than one of any or all of the illustrated elements, processes and devices.

Figure 4A:
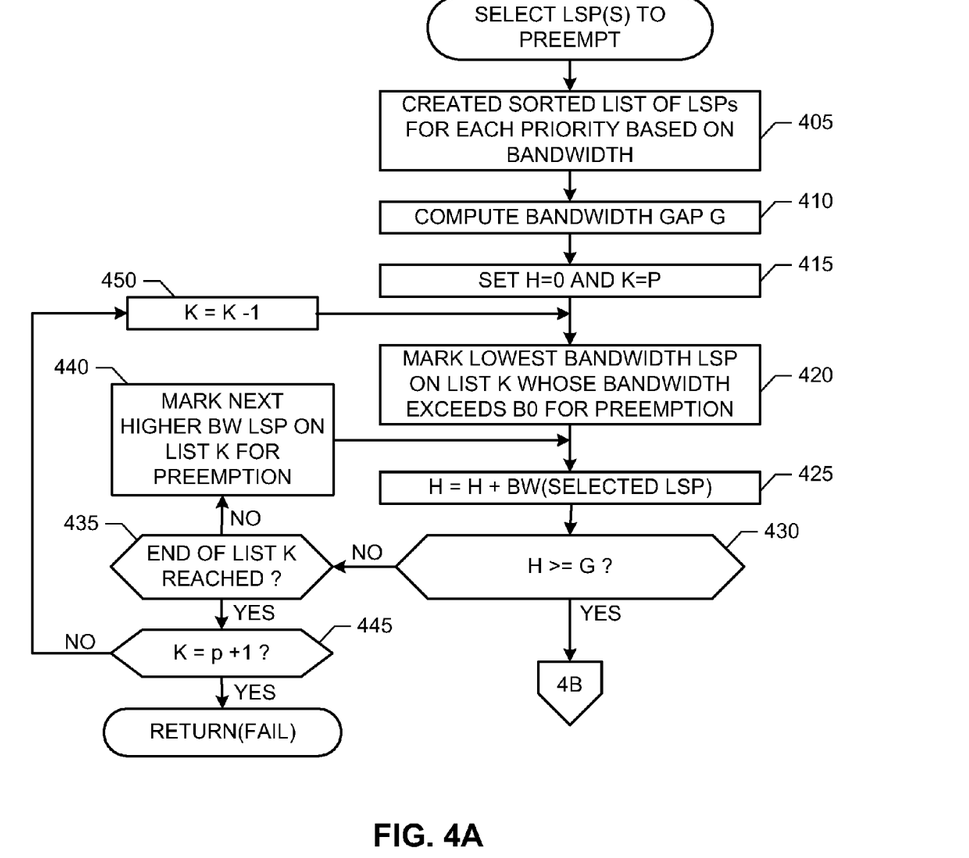
FIGS. 4A and 4B are flowcharts representing an example process that may be embodied as machine-accessible instructions and executed by, for example, one or more processors to implement any of the example LSP preemption selector of FIGS. 1 and 2.
Figure 4B:
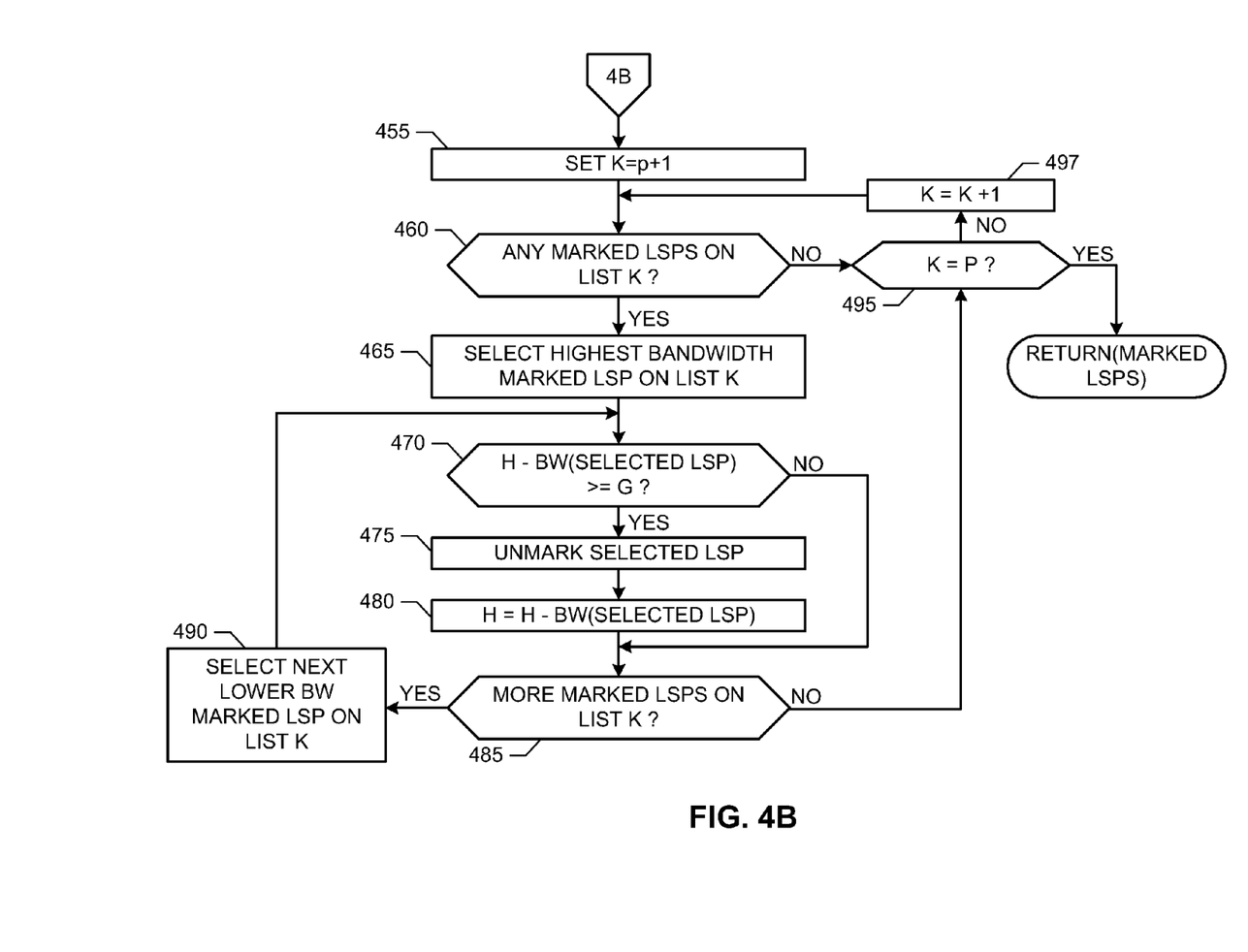
Figure 5:
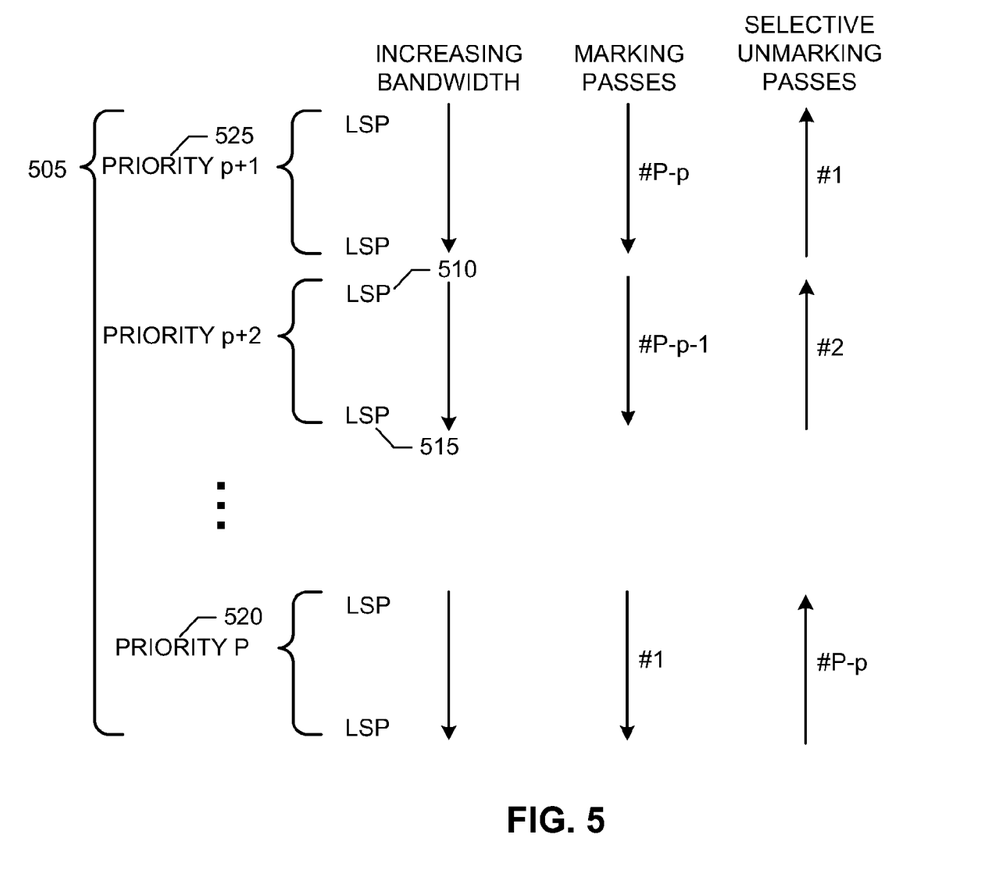
FIG. 5 illustrates an example operation of the example process of FIGS. 4A and 4B.
Figure 6A:
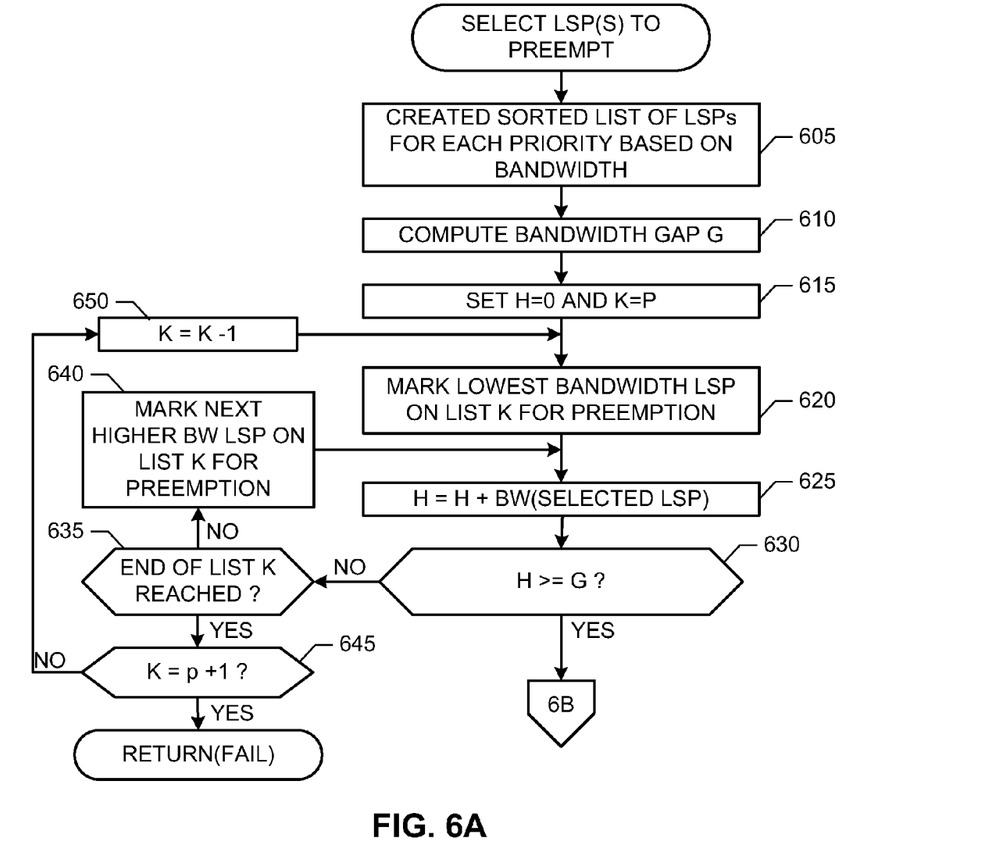
FIGS. 6A and 6B are flowcharts representing another example process that may be embodied as machine-accessible instructions and executed by, for example, one or more processors to implement any of the example LSP preemption selector of FIGS. 1 and 2.
Figure 6B:
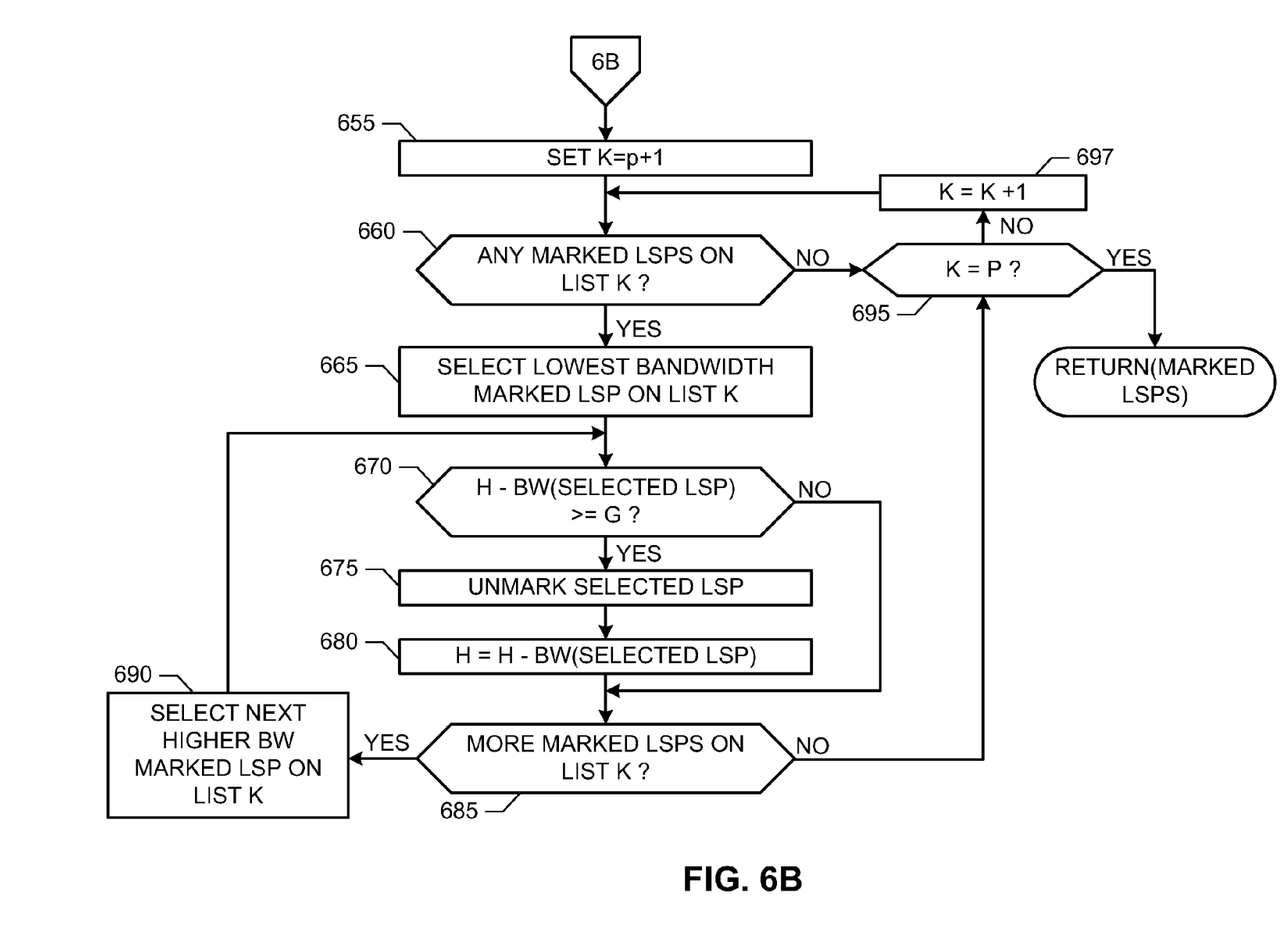
Figure 7:
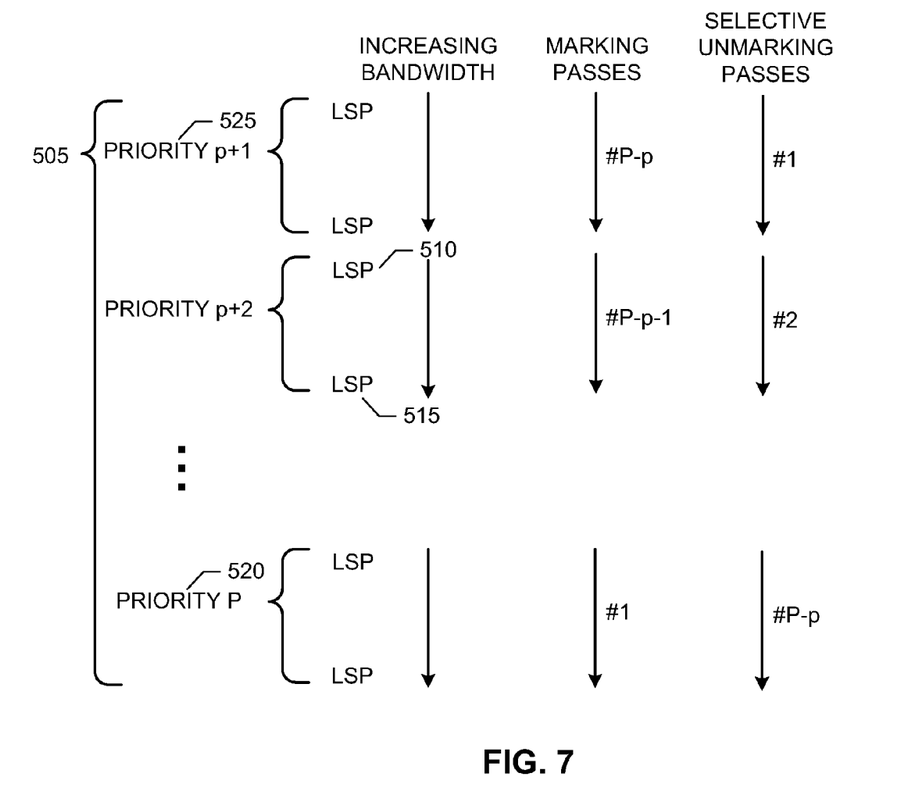
FIG. 7 illustrates an example operation of the example process of FIGS. 6A and 6B.
Figure 8:
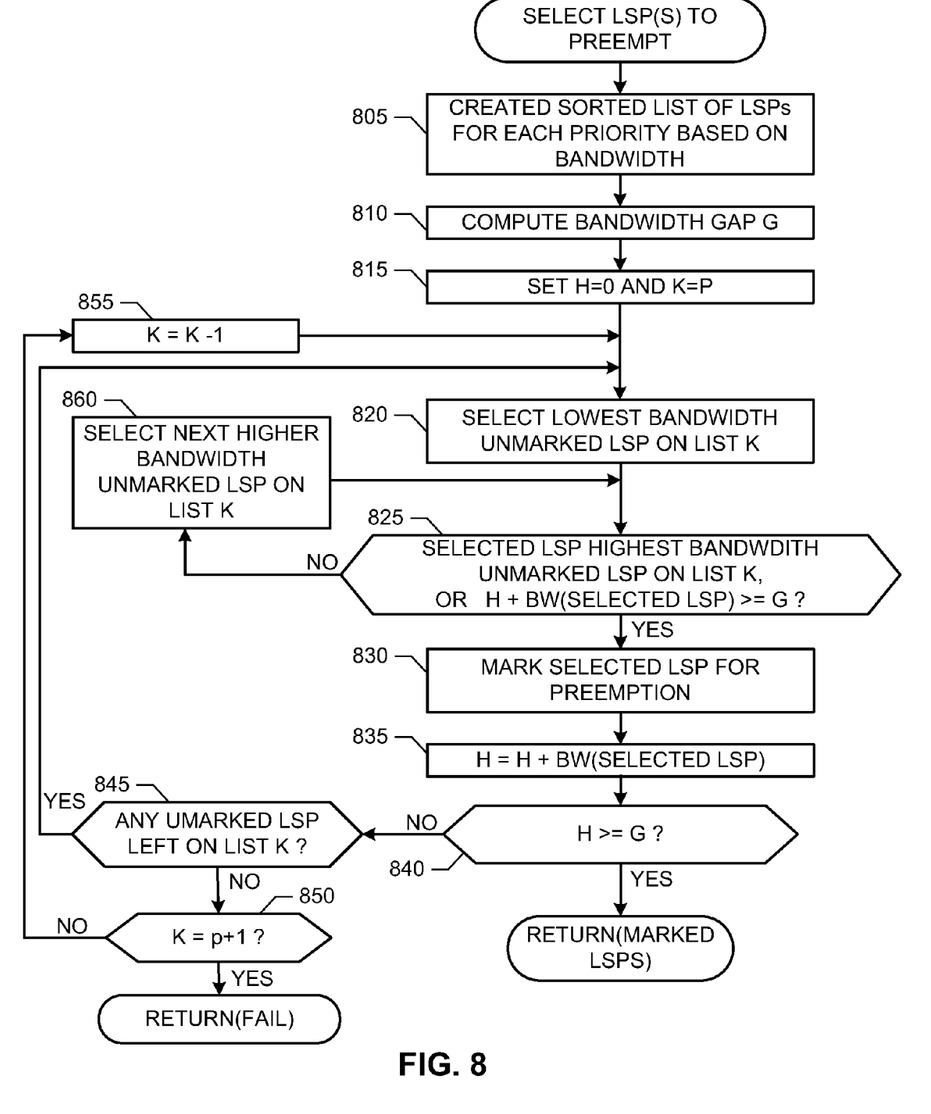
FIG. 8 is a flowchart representing a further example process that may be embodied as machine-accessible instructions and executed by, for example, one or more processors to implement any of the example LSP preemption selector of FIGS. 1 and 2.
Figure 9:
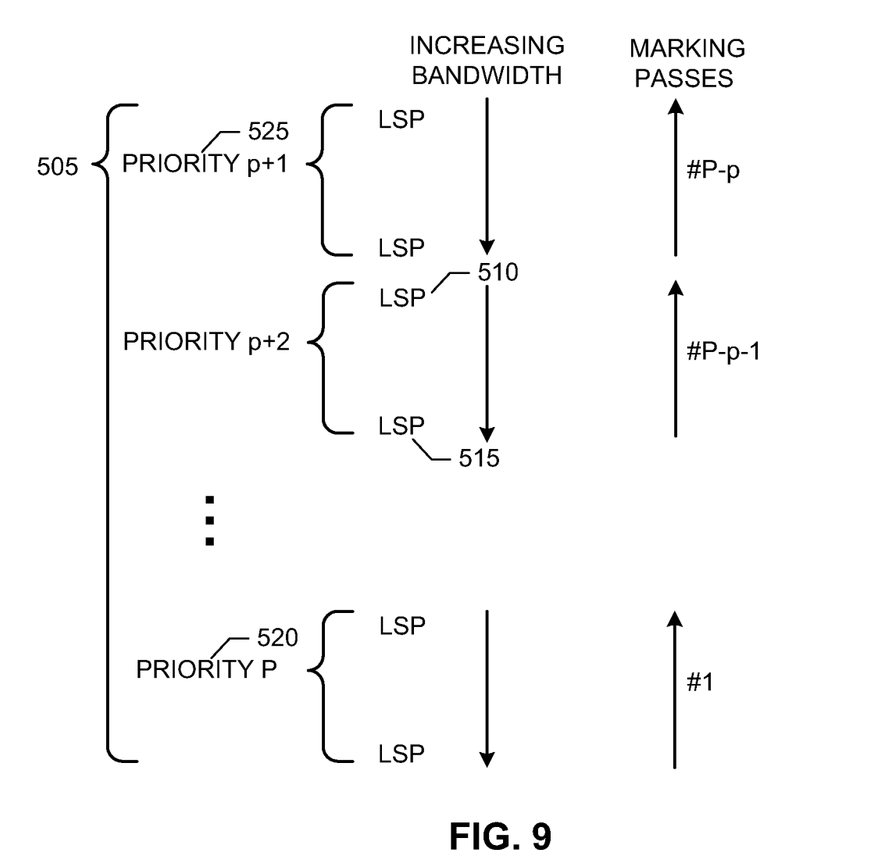
FIG. 9 illustrates an example operation of the example process of FIG. 8.

Three different processes that may be carried out to implement any of the example LSP preemption selectors 130 of FIGS. 1 and 2 are illustrated in FIGS. 4A, 4B, 5, 6A, 6B, 7, 8 and 9. FIGS. 4A and 4B are flowcharts representing one example process that may be embodied as machine-accessible instructions and executed by, for example, one or more processors to implement any of the example LSP preemption selector of FIGS. 1 and 2 to select LSPs for preemption. FIG. 5 illustrates an example operation of the example process of FIGS. 4A and 4B. FIGS. 6A and 6B are flowcharts representing another example process that may be embodied as machine-accessible instructions and executed by, for example, one or more processors to implement any of the example LSP preemption selector of FIGS. 1 and 2 to select LSPs for preemption. FIG. 7 illustrates an example operation of the example process of FIGS. 6A and 6B. FIG. 8 is a flowchart representing a further example process that may be embodied as machine-accessible instructions and executed by, for example, one or more processors to implement any of the example LSP preemption selector of FIGS. 1 and 2 to select LSPs for preemption. FIG. 9 illustrates an example operation of the example process of FIG. 7.

A processor, a controller and/or any other suitable processing device may be used, configured and/or programmed to execute machine-readable instructions implementing the processes or operations represented in FIGS. 4A, 4B, 5, 6A, 6B, 7, 8 and 9. For example, the processes or operations of FIGS. 4A, 4B, 5, 6A, 6B, 7, 8 and 9 may be embodied in coded instructions stored on a tangible computer-readable medium. Alternatively, some or all of the example processes of FIGS. 4A, 4B, 5, 6A, 6B, 7, 8 and 9 may be implemented using any combination(s) of ASIC(s), PLD(s), FPLD(s), FPGA(s), discrete logic, hardware, firmware, etc. Also, some or all of the example processes of FIGS. 4A, 4B, 5, 6A, 6B, 7, 8 and 9 may be implemented manually or as any combination of any of the foregoing techniques, for example, any combination of firmware, software, discrete logic and/or hardware. Further, many other methods of implementing the example operations of FIGS. 4A, 4B, 5, 6A, 6B, 7, 8 and 9 may be employed. For example, the order of execution of the blocks may be changed, and/or one or more of the blocks described may be changed, eliminated, sub-divided, or combined. Additionally, the blocks of any or all of the example processes of FIGS. 4A, 4B, 5, 6A, 6B, 7, 8 and 9 may be carried out sequentially and/or carried out in parallel by, for example, separate processing threads, processors, devices, discrete logic, circuits, etc.

The example processes of FIGS. 4A, 4B, 5, 6A, 6B, 7, 8 and 9 will be described with reference to the example headend router 121 selecting LSPs to preempt to accommodate a new LSP L of priority p on the communication link 126. Let Y=sum of bandwidths of all existing LSPs of link 126+the bandwidth of LSP L X=total useable bandwidth or capacity of the link 126

If, during the reservation of bandwidth for the LSP L, X is less than Y, then it is necessary for the router 126 to preempt one or more LSPs of lower priority than the priority p of LSP L. The shortfall or bandwidth gap G representing the amount of bandwidth that needs to be preempted, can be expressed mathematically as G=Y−X. The example LSP preemption selector 130 of the router 126 selects the preempted LSPs so that H>=G, where H represents the sum or total bandwidth of the LSPs selected for preemption.

Each of the example processes illustrated in FIGS. 4A, 4B, 5, 6A, 6B, 7, 8 and 9 begins by forming a plurality of lists of existing LSPs 505 (FIGS. 5, 7 and 9) for respective ones of the priorities p+1, p+2, ... P. For each of the priorities p+1, p+2, ... P, the respective list of LSPs is sorted in increasing order of bandwidth, as shown in FIGS. 5, 7 and 9. In other words, the first LSP in each list corresponds to the LSP (e.g., LSP 510 of the list for priority p+2) having the smallest associated bandwidth and the last LSP in each list corresponds to the LSP (e.g., LSP 515 of the list for priority p+2) having the largest associated bandwidth.

The example process of FIGS. 4A and 4B marks an initial set of LSPs for preemption (FIG. 4A), and then unmarks selective ones of the initially marked LSPs to reduce or minimize bandwidth overshoot and the number of preempted LSPs (FIG. 4B). The illustrated example of FIG. 4A sequentially processes the lists 505 of sorted LSPs starting with a list 520 associated with the lowest priority P. As shown in FIG. 5, the LSPs in each list are marked starting with the LSP having the lowest bandwidth 510 and sequentially considering LSPs of increasing bandwidth. LSPs are marked until H>=G. The illustrated example of FIG. 4B sequentially processes the LSPs marked by the example process of FIG. 4A starting with a list 525 associated with priority p+1. As shown in FIG. 5, the marked LSPs in each list are considered starting with the LSP having the highest bandwidth 515 that was marked by the process of FIG. 4A and sequentially considering LSPs of decreasing bandwidth. Each considered LSP is only unmarked if the unmarking of that LSP would not cause H<G.

The example process of FIG. 4A begins with the example LSP preemption selector 130 forming the sorted lists 505 of LSPs for each of the priorities p+1, p+2, ... P (block 405). The example routing and forwarding engine 210 computes the bandwidth gap G (block 410). The LSP preemption selector 130 sets H=0 and K=P (block 415). For the presently considered sorted list of LSPs corresponding to priority K, the LSP preemption selector 130 marks the lowest bandwidth LSP in the list whose bandwidth exceeds b0 for preemption (block 420). The threshold b0 is selected to minimize, reduce and/or prevent a large number of low bandwidth LSPs from being preempted. H is updated to include the bandwidth of the marked LSP (block 425).

When H exceeds G (block 430), control proceeds to the example process of FIG. 4B. While H does not exceed G (block 430), the LSP preemption selector 130 determines whether the end of the currently considered list has been reached (block 435). If the end of the list has not been reached (block 435), the next higher bandwidth LSP in the list is marked for preemption (block 440) and control returns to block 425.

If the end of the list has been reached (block 435), the LSP preemption selector 130 determines whether all lists of priority lower than the LSP L have been considered (block 445). If all lists have been processed (block 445), control exits from the process of FIG. 4A with a failure condition because not enough LSPs were able to be preempted.

If not all LSPs have been processed (block 445), K is decremented to consider the sorted list of LSPs corresponding the next higher priority (block 450), and control returns to block 420.

The example process of FIG. 4B begins with the LSP preemption selector 130 setting K=p+1 (block 455). If at least one LSPs is marked in the list K (block 460), the LSP preemption selector 130 selects the marked LSP having the highest associated bandwidth (block 465). If not preempting the presently considered LSP would result in a sufficient amount of bandwidth being preempted (block 470), the presently considered LSP is unmarked (block 475), and H is updated to reflecting the unmarking of the presently considered LSP (block 480). If there are more LSPs in the presently considered list K (block 485), the marked LSP having the next lower bandwidth (block 490) and control returns to block 470.

If there are no more marked LSPs in the presently considered list K (block 485), the LSP preemption selector 130 determines whether all lists have been processed (block 495). If all lists have been processed (block 495), control exits from the example process of FIG. 4B returning a list of the marked LSPs. If not all lists have been processed (block 495), LSP preemption selector 130 increments K to consider the next lower priority list (block 497), and control returns to block 460.

Returning to block 470, if not preempting the presently considered LSP would result in an insufficient amount of bandwidth being preempted (block 470), control proceeds to block 485 without unmarking the presently considered LSP or updating H.

Returning to block 460, if there are no marked LSPs in the presently considered list (block 460), control proceeds to block 495 to determine whether there are more lists of LSPs to consider.

The example process of FIGS. 6A and 6B marks an initial set of LSPs for preemption (FIG. 6A), and then unmarks selective ones of the initially marked LSPs to reduce or minimize bandwidth overshoot and the number of preempted LSPs (FIG. 6B). The illustrated example of FIG. 6A sequentially processes the lists 505 of sorted LSPs starting with the list 520 associated with the lowest priority P. As shown in FIG. 7, the LSPs in each list are marked starting with the LSP having the lowest bandwidth 510 and sequentially considering LSPs of increasing bandwidth. LSPs are marked until H>=G. The illustrated example of FIG. 6B sequentially processes the LSPs marked by the example process of FIG. 6A starting with the list 525 associated with priority p+1. In contrast to FIG. 4B and as shown in FIG. 7, the marked LSPs in each list are considered starting with the LSP having the lowest bandwidth 510 that was marked by the process of FIG. 6A and sequentially considering LSPs of increasing bandwidth. Each considered LSP is only unmarked if the unmarking of that LSP would not cause H<G.

The example process of FIG. 6A begins with the example LSP preemption selector 130 forming the sorted lists 505 of LSPs for each of the priorities p+1, p+2, ... P (block 605). The example routing and forwarding engine 210 computes the bandwidth gap G (block 610). The LSP preemption selector 130 sets H=0 and K=P (block 615). For the presently considered sorted list of LSPs corresponding to priority K, the LSP preemption selector 130 marks the lowest bandwidth LSP (block 620). H is updated to include the bandwidth of the marked LSP (block 625).

When H exceeds G (block 630), control proceeds to the example process of FIG. 6B. While H does not exceed G (block 630), the LSP preemption selector 130 determines whether the end of the currently considered list has been reached (block 635). If the end of the list has not been reached (block 635), the next higher bandwidth LSP in the list is marked for preemption (block 640) and control returns to block 625.

If the end of the list has been reached (block 635), the LSP preemption selector 130 determines whether all lists of priority lower than the LSP L have been considered (block 645). If all lists have been processed (block 645), control exits from the process of FIG. 6A with a failure condition because not enough LSPs were able to be preempted.

If not all LSPs have been processed (block 645), K is decremented to consider the sorted list of LSPs corresponding the next higher priority (block 650), and control returns to block 620.

The example process of FIG. 6B begins with the LSP preemption selector 130 setting K=p+1 (block 655). If at least one LSPs is marked in the list K (block 660), the LSP preemption selector 130 selects the marked LSP having the lowest associated bandwidth (block 665). If not preempting the presently considered LSP would result in a sufficient amount of bandwidth being preempted (block 670), the presently considered LSP is unmarked (block 675), and H is updated to reflecting the unmarking of the presently considered LSP (block 680). If there are more LSPs in the presently considered list K (block 685), the marked LSP having the next higher bandwidth (block 690) and control returns to block 670.

If there are no more marked LSPs in the presently considered list K (block 685), the LSP preemption selector 130 determines whether all lists have been processed (block 695). If all lists have been processed (block 695), control exits from the example process of FIG. 6B returning a list of the marked LSPs. If not all lists have been processed (block 695), LSP preemption selector 130 increments K to consider the next lower priority list (block 697), and control returns to block 660.

Returning to block 670, if not preempting the presently considered LSP would result in an insufficient amount of bandwidth being preempted (block 670), control proceeds to block 685 without unmarking the presently considered LSP or updating H.

Returning to block 660, if there are no marked LSPs in the presently considered list (block 660), control proceeds to block 695 to determine whether there are more lists of LSPs to consider.

The example process of FIG. 8 marks a set of LSPs for preemption. The illustrated example of FIG. 8 sequentially processes the lists 505 of sorted LSPs starting with the list 520 associated with the lowest priority P. In contrast to FIGS. 4A and 6A and as shown in FIG. 9, the LSPs in each list are marked starting with the LSP having the highest bandwidth 515 and sequentially considering LSPs of decreasing bandwidth. LSPs are marked until H>=G.

The example process of FIG. 8 begins with the example LSP preemption selector 130 forming the sorted lists 505 of LSPs for each of the priorities p+1, p+2, . . . P (block 805). The example routing and forwarding engine 210 computes the bandwidth gap G (block 810). The LSP preemption selector 130 sets H=0 and K=P (block 815). For the presently considered sorted list of LSPs corresponding to priority K, the LSP preemption selector 130 selects the lowest bandwidth unmarked LSP (block 820).

If the presently considered LSP is the highest bandwidth unmarked LSP in the presently considered list or if preemption of the presently considered LSP would result in a sufficient amount of preempted bandwidth (block 825), the presently considered LSP is marked for preemption (block 830) and H is updated to include the bandwidth of the marked LSP (block 835).

If a sufficient amount of bandwidth has been preempted (block 840), control exits from the example process of FIG. 8 returning a list of the marked LSPs. If a sufficient amount of bandwidth has not been preempted (block 840), the LSP preemption selector 130 determines whether there are any unmarked LSPs left on the presently considered list (block 845). If there are more unmarked LSPs on the presently considered list (block 845), control returns to block 820 to select the lowest bandwidth unmarked LSP.

If there are no unmarked LSPs left on the presently considered list (block 845), the LSP preemption selector 130 determines whether there are more lists to process (block 850). If all lists have been processed (i.e., K=p+1) (block 850), control exits from the process of FIG. 8 with a failure condition because not enough LSPs were able to be preempted.

If there are more lists to process (i.e., K>p+1) (block 850), the LSP preemption selector 130 decrements K to consider the list corresponding to the next higher priority (block 855).

Returning to block 825, if the presently considered LSP is not the highest bandwidth unmarked LSP in the presently considered list and if preemption of the presently considered LSP would not result in a sufficient amount of preempted bandwidth (block 825), the LSP preemption selector 130 selects the next higher bandwidth unmarked LSP on the presently considered list (block 860) and control returns to block 825.

Figure 10:
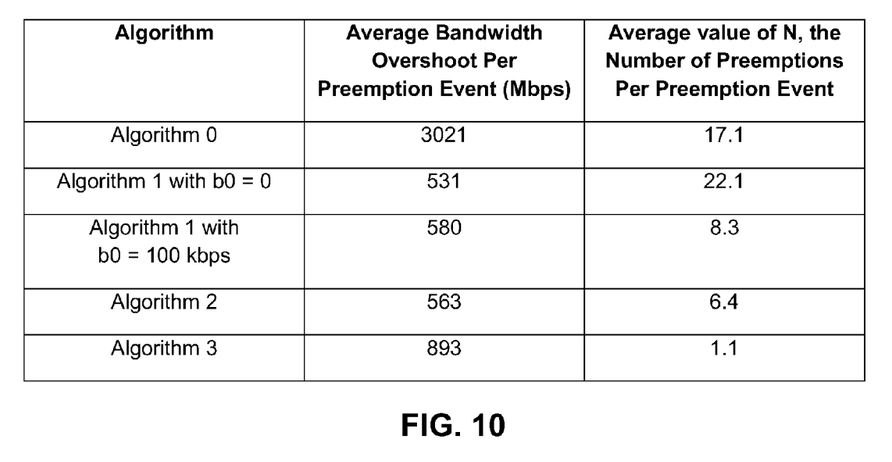
FIG. 10 illustrates an example performance comparison of the example LSP preemption selection processes described herein.

FIG. 10 illustrates an example performance comparison of the example LSP preemption selection processes described herein FIG. 10 shows results collected using a discrete event simulation of the performance of the example processes on an existing network topology using a realistic traffic demand matrix. In the example of FIG. 10, two priority classes (P=2) were used with 40% traffic in the higher priority class (p=1) and 60% traffic in the lower priority class (p=2). A full mesh of MPLS-TE LSPs of each of the two priority classes were modeled on an example network comprising 50 backbone routers. The example network was designed tightly (using traffic engineering) to have just enough capacity to carry the peak traffic demand under "no-failure" condition and also under all single failure conditions. Failure events included single link failures, single router failures and single fiber span failures (a total of 170 failure events). The simulation model considered each of the failure events and studied the reroute of LSPs and preemptions. During each preemption event, two basic performance measures were observed. The first one is the "bandwidth overshoot" H−G, and N, the number of LSPs preempted. FIG. 10 shows the average values of these performance measures over several hundred simulated preemption events. In FIG. 10, the example processes disclosed herein are compared with a baseline process that randomly selects LSPs for preemption. In FIG. 10, the baseline process is designated "Algorithm 0," the example process of FIGS. 4A, 4B and 5 is designated "Algorithm 1," the example process of FIGS. 6A, 6B and 7 is designated "Algorithm 2," and the example process of FIGS. 8 and 9 is designated "Algorithm 3."

As shown in FIG. 10, the disclosed example processes perform significantly better (lower average overshoot and lower average number of preempted LSPs) than the baseline selection process. On average, the example process of FIGS. 4A, 4B and 5 with b0=0 results in the smallest average overshoot because it selectively unmarks LSPs starting with the highest bandwidth LSPs and, thus, often marks several low bandwidth LSPs for preemption providing finer granularity in preempted bandwidth but a larger average number of preempted LSPs. As illustrated in FIG. 10, increasing b0 to 100 kbps slightly increases the average bandwidth overshoot but significantly reduces the average number of preempted LSPs.

Like the process of FIGS. 4A, 4B and 5 with b0=0, the example process of FIGS. 6A, 6B and 7 does not disregard LSPs having low bandwidths and, thus, has a small average bandwidth overshoot. However, unlike the process of FIGS. 4A, 4B and 5 with b0=0, the example process of FIGS. 6A, 6B and 7 selectively unmarks LSPs for preemption starting with the lowest bandwidth marked LSPs and, thus, reduces the average number of preempted LSPs.

The example process of FIGS. 8 and 9 differs from the example processes of FIGS. 4A, 4B, 5, 6A, 6B and 7 in that it seeks to identify one large bandwidth LSP for preemption. Accordingly, the example process of FIGS. 8 and 9 results in the smallest average number of preempted LSPs at the expense of increasing the average bandwidth overshoot.

Figure 11:
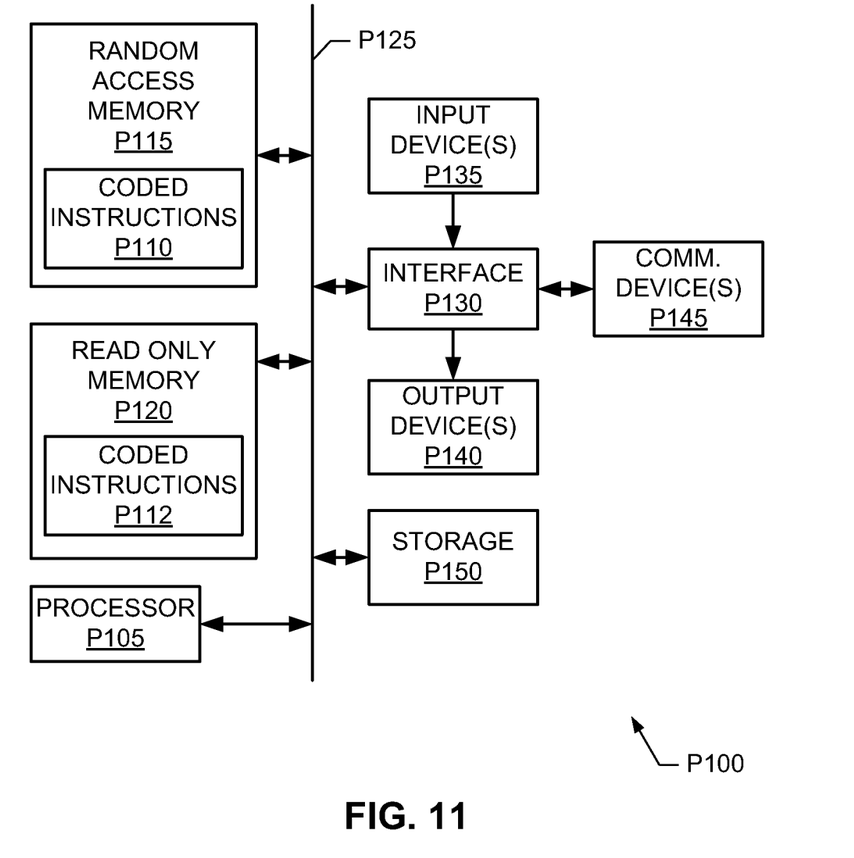
FIG. 11 is a schematic illustration of an example processor platform that may be used and/or programmed to perform the example processes represented by FIGS. 3, 4A, 4B, 6A, 6B and 8 to select LSPs for preemption.

FIG. 11 is a block diagram of an example processor platform P100 capable of executing the example instructions of FIGS. 3, 4A, 4B, 5, 6A, 6B and 7-9 to implement any of the example routers 120-122, 200 and the example LSP preemption selectors 130 of FIGS. 1 and 2. The example processor platform P100 can be, for example, a router, a workstation, a server and/or any other type of computing device containing a processor.

The processor platform P100 of the instant example includes at least one programmable processor P105. For example, the processor P105 can be implemented by one or more Intel® microprocessors from the Pentium® family, the Itanium® family or the XScale® family. Of course, other processors from other processor families and/or manufacturers are also appropriate. The processor P105 executes coded instructions P110 and/or P112 present in main memory of the processor P105 (e.g., within a volatile memory P115 and/or a non-volatile memory P120) and/or in a storage device P150. The processor P105 may execute, among other things, the example machine-accessible instructions of FIGS. 4-6 to implement NF-TCP. Thus, the coded instructions P110, P112 may include the example instructions of FIGS. 3, 4A, 4B, 5, 6A, 6B and 7-9.

The processor P105 is in communication with the main memory including the non-volatile memory P110 and the volatile memory P115, and the storage device P150 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of RAM device. The non-volatile memory P110 may be implemented by flash memory and/or any other desired type of memory device. Access to the memory P115 and the memory P120 may be controlled by a memory controller.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

The interface circuit P130 may also includes one or more communication device(s) 145 such as a network interface card to facilitate exchange of data, packets, and/or routing information with other nodes and/or routers of a network.

In some examples, the processor platform P100 also includes one or more mass storage devices P150 to store software and/or data. Examples of such storage devices P150 include a floppy disk drive, a hard disk drive, a solid-state hard disk drive, a CD drive, a DVD drive and/or any other solid-state, magnetic and/or optical storage device. The example storage devices P150 may be used to, for example, store the example coded instructions of FIGS. 3, 4A, 4B, 5, 6A, 6B and 7-9.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   sorting, with a processor, a first list of first label switched paths based on their respective bandwidths and priorities to form a sorted first list, each of the label switched paths having a lower priority than a requested label switched path, the requested label switched path having a second bandwidth;
   sequentially marking, with the processor, the first label switched paths for preemption based on their position in the sorted list until a cumulative bandwidth associated with the marked label switched paths exceeds a bandwidth gap corresponding to a difference between the second bandwidth and a remaining available bandwidth; and
   configuring a routing engine to preempt the marked first label switched paths.

2. A method as defined in claim 1, wherein the first label switched paths have a first priority, and further comprising:
   sorting a second list of second label switched paths based on their respective bandwidths to form a second sorted list, each of the second label switched paths having a higher priority than the first priority;
   sequentially marking the second label switched paths for preemption based on their position in the second sorted list until a second cumulative bandwidth associated with the marked first and second label switched paths exceeds the bandwidth gap; and
   configuring the routing engine to preempt the marked second label switched paths.

3. A method as defined in claim 2, wherein the first and second label switched paths are sequentially marked in order of increasing bandwidth, and further comprising sequentially unmarking selective ones of the second label switched paths in order of decreasing bandwidth while the second cumulative bandwidth exceeds the bandwidth gap.

4. A method as defined in claim 1, wherein the first label switched paths are sequentially marked in order of increasing bandwidth, and further comprising sequentially unmarking selective ones of the first label switched paths in order of decreasing bandwidth while the cumulative bandwidth exceeds the bandwidth gap.

5. A method as defined in claim 1, wherein the first label switched paths are sequentially marked in order of increasing bandwidth, and further comprising sequentially unmarking selective ones of the first label switched paths in order of increasing bandwidth while the cumulative bandwidth exceeds the bandwidth gap.

6. A method as defined in claim 1, wherein the first label switched paths are sequentially marked in order of increasing bandwidth starting with a first label switched path having a respective bandwidth exceeding a threshold.

7. A method as defined in claim 1, wherein the first label switched paths have a lowest priority, and wherein the first label switched paths are sequentially marked in order of decreasing bandwidth starting with a first label switched path having a largest respective bandwidth.

8. A method as defined in claim 1, wherein the remaining available bandwidth represents a difference between a link capacity and a reserved bandwidth.

9. A router comprising:
a routing database to store routing information for first label switched paths;
a preemption selector to:
sort a first list of the first label switched paths based on their respective bandwidths and priorities to form a sorted first list, each of the label switched paths having a lower priority than a new label switched path, the new label switched path having a second bandwidth; and
sequentially mark the first label switched paths for preemption based on their position in the sorted list until a cumulative bandwidth associated with the marked label switched paths exceeds a bandwidth gap, the bandwidth gap corresponding to a difference between the second bandwidth and a remaining available bandwidth; and
a routing and forwarding engine to update the routing database to preempt the marked first label switched paths.

10. A router as defined in claim 9, wherein the routing and forwarding engine is to receive a request to reserve bandwidth for the new label switched path.

11. A router as defined in claim 9, wherein
the first label switched paths have a first priority;
the preemption selector is to:
sort a second list of second label switched paths based on their respective bandwidths to form a second sorted list, each of the second label switched paths having a higher priority than the first priority; and
sequentially mark the second label switched paths for preemption based on their position in the second sorted list until a second cumulative bandwidth associated with the marked first and second label switched paths exceeds the bandwidth gap; and
the routing and forwarding engine is to update the routing database to preempt the marked first label switched paths.

12. A router as defined in claim 9, wherein:
the first label switched paths have a first priority;
the preemption selector is to:
sort a second list of second label switched paths based on their respective bandwidths to form a second sorted list, each of the second label switched paths having a higher priority than the first priority; and
sequentially mark the second label switched paths for preemption based on their position in the second sorted list until a second cumulative bandwidth associated with the marked first and second label switched paths exceeds the bandwidth gap; and
the routing and forwarding engine is to update the routing database to preempt the marked first label switched paths.

13. A router as defined in claim 9, wherein the preemption selector is to:
sequentially mark the first label switched paths in order of increasing bandwidth; and
sequentially unmark selective ones of the first label switched paths in order of decreasing bandwidth while the cumulative bandwidth exceeds the bandwidth gap.

14. A router as defined in claim 9, wherein the preemption selector is to:
sequentially mark first ones of the first label switched paths in order of increasing bandwidth; and
sequentially unmark selective ones of the first label switched paths in order of increasing bandwidth while the cumulative bandwidth exceeds the bandwidth gap.

15. A router as defined in claim 9, wherein the preemption selector is to sequentially mark the first label switched paths in order of increasing bandwidth starting with a first label switched path having a respective bandwidth exceeding a threshold.

16. A router as defined in claim 9, wherein the first label switched paths have a lowest priority, and the preemption selector is to sequentially mark the first label switched paths in order of decreasing bandwidth starting with a first label switched path having a largest respective bandwidth.

17. A tangible machine readable storage device comprising instructions which, when executed, cause a machine to perform operations comprising:
sorting a first list of first label switched paths based on their respective bandwidths and priorities to form a sorted first list, each of the label switched paths having a lower priority than a requested label switched path, the requested label switched path having a second bandwidth;
sequentially marking the first label switched paths for preemption based on their position in the sorted list until a cumulative bandwidth associated with the marked label switched paths exceeds a bandwidth gap, the bandwidth gap corresponding to a difference between the second bandwidth and a remaining available bandwidth; and
configuring a routing engine to preempt the marked first label switched paths.

18. A tangible machine readable storage device as defined in claim 17, wherein the first label switched paths have a first priority and wherein the instructions, when executed, cause the machine to perform further operations comprising:
sorting a second list of second label switched paths based on their respective bandwidths to form a second sorted list, each of the second label switched paths having a higher priority than the first priority;
sequentially marking the second label switched paths for preemption based on their position in the second sorted list until a second cumulative bandwidth associated with the marked first and second label switched paths exceeds the bandwidth gap; and
configuring the routing engine to preempt the marked second label switched paths.

19. A tangible machine readable storage device as defined in claim 17, wherein the instructions, when executed, cause the machine to perform further operations comprising:
sequentially marking the first label switched paths in order of increasing bandwidth; and
sequentially unmarking selective ones of the first label switched paths in order of decreasing bandwidth while the cumulative bandwidth exceeds the bandwidth gap.

* * * * *